United States Patent [19]

Kozyrski et al.

[11] Patent Number: 5,168,788
[45] Date of Patent: Dec. 8, 1992

[54] CUTTING HEAD TURRET ASSEMBLY

[75] Inventors: Vincent T. Kozyrski, Plainville, Conn.; Alan R. Peters, Cape Coral, Fla.

[73] Assignee: The Fletcher - Terry Company, Farmington, Conn.

[21] Appl. No.: 646,351

[22] Filed: Jan. 25, 1991

Related U.S. Application Data

[63] Continuation-in-part of Ser. No. 216,767, Jul. 8, 1988, Pat. No. 4,987,814.

[51] Int. Cl.$^5$ .................... C03B 33/07; C03B 33/10; B25D 3/08
[52] U.S. Cl. ........................ 83/863; 83/549; 83/884; 83/698; 30/164.95; 225/96.005; 225/96.5
[58] Field of Search ........... 225/96.5, 103; 30/329, 30/339, 340, 164.9, 164.95; 33/32.3, 44, 18.1; 407/48, 103, 104; 83/862, 863, 864, 881, 882, 883, 884, 549, 552, 698

[56] References Cited

U.S. PATENT DOCUMENTS

| 1,578,477 | 3/1926 | Smith et al. | 30/292 |
| 3,130,499 | 4/1964 | Hanneken et al. | 33/32.3 |
| 3,151,794 | 10/1964 | Brand | 83/884 |
| 3,165,018 | 1/1965 | Brand | 83/884 |
| 3,889,862 | 6/1975 | Insolio et al. | 225/96.5 |
| 4,227,306 | 10/1980 | Meshulam | 30/339 |
| 4,545,515 | 10/1985 | Kozyrski | 225/96.5 |
| 4,881,439 | 11/1989 | Biedermann et al. | 83/879 |
| 4,987,814 | 1/1991 | Kozyrski et al. | 83/884 |

FOREIGN PATENT DOCUMENTS 834547 3/1919 Switzerland .................. 30/339

Primary Examiner—Hien H. Phan
Attorney, Agent, or Firm—Ira S. Dorman

[57] ABSTRACT

A turret assembly for a cutting head has a glass-cutting wheel and a plastic-cutting blade portion disposed at spaced peripheral locations. Rotation of the turret body brings the cutting elements into their operative positions, and cooperating detent elements ensure reliable indexing of the turret and proper orientation of the leading edge of the plastic-cutting blade portion.

10 Claims, 4 Drawing Sheets

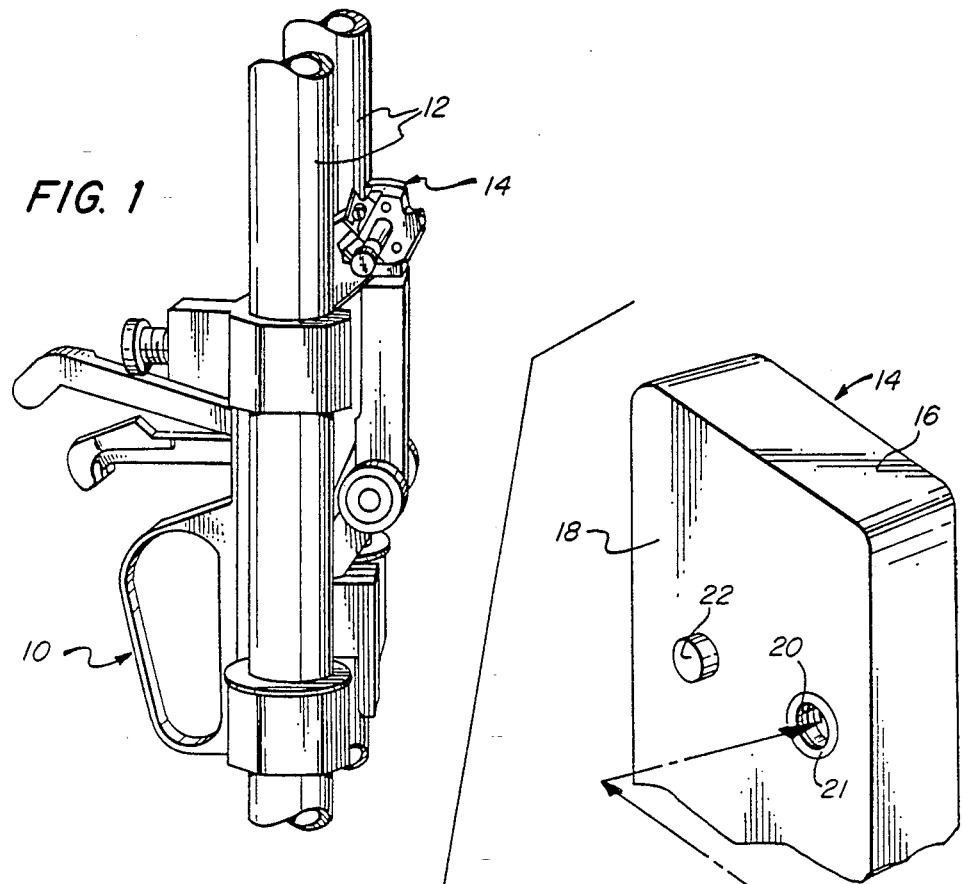
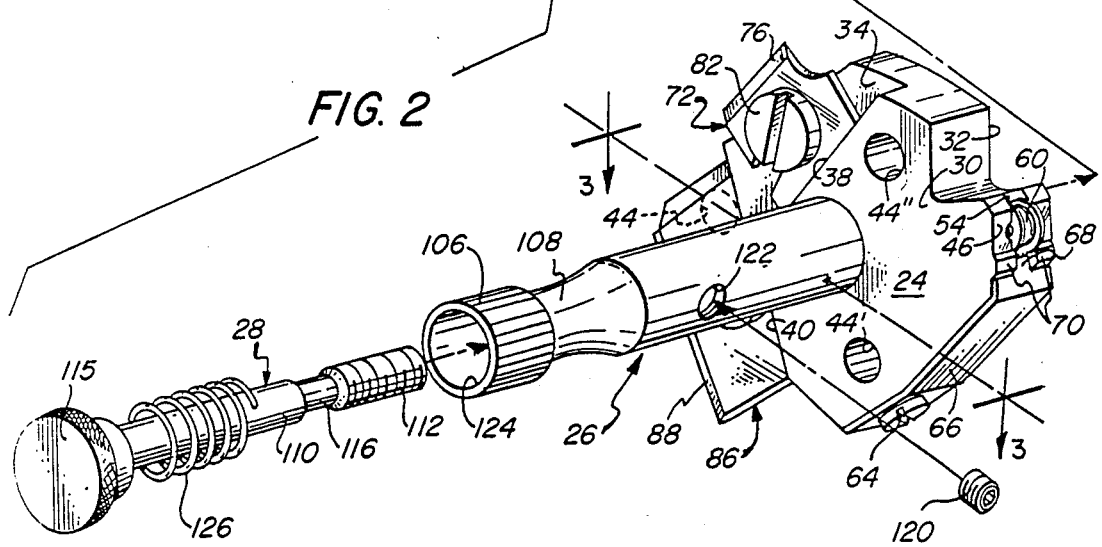
FIG. 1
FIG. 2

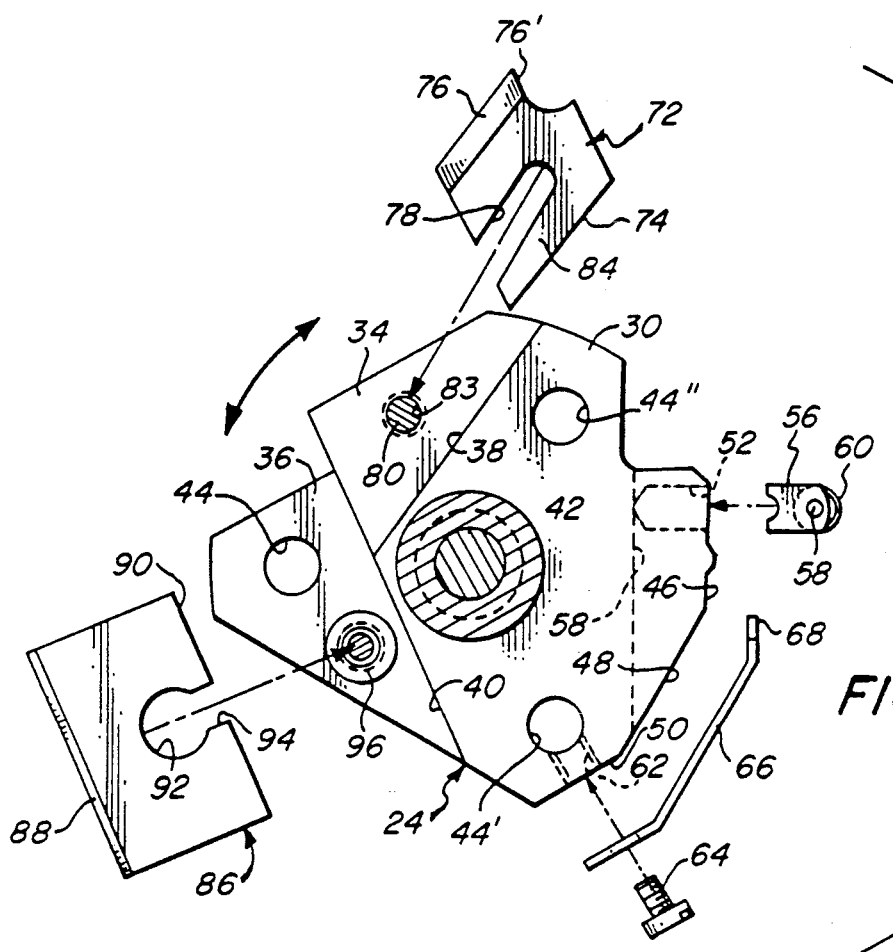

CUTTING HEAD TURRET ASSEMBLY

CROSS REFERENCE TO RELATED APPLICATION

This application is a continuation-in-part of copending application Ser. No. 07/216,767, filed Jul. 8, 1988 and now issued as U.S. Pat. No. 4,987,814.

BACKGROUND OF THE INVENTION

A machine for cutting glass, plastic and mat is described in Kozyriski U.S. Pat. No. 4,545,515, issued Oct. 8, 1985, which machine is highly effective for its intended purposes. The cutting head described in the patent is adapted to support an elongated pillar post assembly, and the use of interchangeable posts is taught, one supporting a plastic sheet cutting blade and a glass cutting wheel on its opposite ends, and another supporting a mat cutting blade. Despite the benefits afforded by the head assembly and machine of the Kozyriski patent, added convenience of operation and use would of course be a worthwhile achievement.

Accordingly, it is the broad object of the present invention to provide a novel turret assembly for use in a head for a glass-, plastic-, and mat-cutting machine, and a novel machine incorporating the same, the turret assembly having a plurality of cutting elements mounted thereon which can selectively be brought into operative position, quickly and easily and without need for removal or replacement of any part.

It is a more specific object of the invention to provide such a turret assembly and machine, in which assembly the cutting elements are securely held in optimal positions for cutting effectiveness.

Other objects of the invention are to provide a turret assembly having the foregoing features and advantages, which assembly is comprised of relatively few parts and is relatively inexpensive and facile to manufacture.

SUMMARY OF THE INVENTION

It has now been found that certain of the foregoing and related objects of the invention are attained by the provision of a turret assembly, comprising a generally planar turret body having a peripheral edge; and supporting part; means mounting the turret body on the supporting part for rotation about an axis perpendicular to the plane of the body; and a plurality of detent elements cooperatively disposed on the body and the supporting part for disengagably affixing them in each of a plurality of rotated relative relationships. Blade means, and a glass-cutting element, are provided on the turret body. The glass-cutting element is located at a first location along the peripheral edge of the body, and projects outwardly therebeyond; the blade means is comprised of a planar blade having an unsharpened rectilinear edge along one margin, and providing a plastic-cutting portion located at a second location along the peripheral edge of the body, and also projecting outwardly therebeyond. One of the detent elements is associated with the "first" location, and cooperate with another such element so as to position the glass-cutting element for operation by movement along a rectilinear axis. A second detent element is associated with the "second" location, and serves to position the plastic-cutting portion of the blade means (in a second plastic relationship of the turret body) for operation by movement along the same rectilinear axis. The plastic-cutting portion comprises a sharpened, rectilinear edge extending along a margin opposite to that along which the unsharpened edge extends, and an intersecting leading edge extending at an angle to the sharpened edge. The unsharpened edge is disposed against a wall on the turret body, thus orienting the leading edge of the blade portion at a predetermined, optimal angle in the "second" relationship of the turret body.

Normally, the assembly will additionally include an elongated ramp element that has one end attached to the turret body, and that extends along its peripheral edge so as to provide a free end portion disposed adjacent the glass-cutting element and confronting the leading edge of the plastic-cutting blade portion. Most desirably, the blade means will include a mat-cutting portion located at a third location along the peripheral edge of the turret body and projecting outwardly therebeyond, a third detent element being associated with the "third" location as to cooperatively position that portion of the blade means for operation in a third rotated relationship. The mat-cutting portion will comprise a sharpened, rectilinear blade edge which forms, in its operative position, an angle with the rectilinear axis of movement; generally, an angle of about 35° will be found optimal, and in most instances the glass-cutting element and the plastic-cutting and mat-cutting portions will all be disposed on a medial plane of the turret body.

Other objects of the invention are achieved by the provision of a sheet cutting machine, including means for supporting the sheet material to be cut, a multipurpose cutting head, and means for supporting the cutting head for movement on an axis parallel to the plane in which the supported sheet material is disposed. The cutting head of the machine includes a turret assembly, as herein described.

BRIEF DESCRIPTION OF THE DRAWINGS

FIG. 1 is a perspective view of a cutting head including a turret body embodying the present invention, the head being mounted upon the guide rails (shown fragmentarily) of a sheet-cutting machine;

FIG. 2 is an exploded perspective view, drawn to a scale greatly enlarged from that of FIG. 1, showing the turret assembly of the invention, and fragmentarily illustrating the supporting part of the cutting head on which the turret assembly is mounted;

FIG. 4 is an exploded plan view of the turret body portion, and the cutting elements and other components associated therewith;

FIG. 5 is a side elevational view of the turret assembly and supporting part of the cutting head, showing the glass cutting wheel in operative position against an edge of the glass sheet, the sleeve portion and mounting bolt of the assembly being shown in section;

DETAILED DESCRIPTION OF THE ILLUSTRATION EMBODIMENT

Figure 3A:
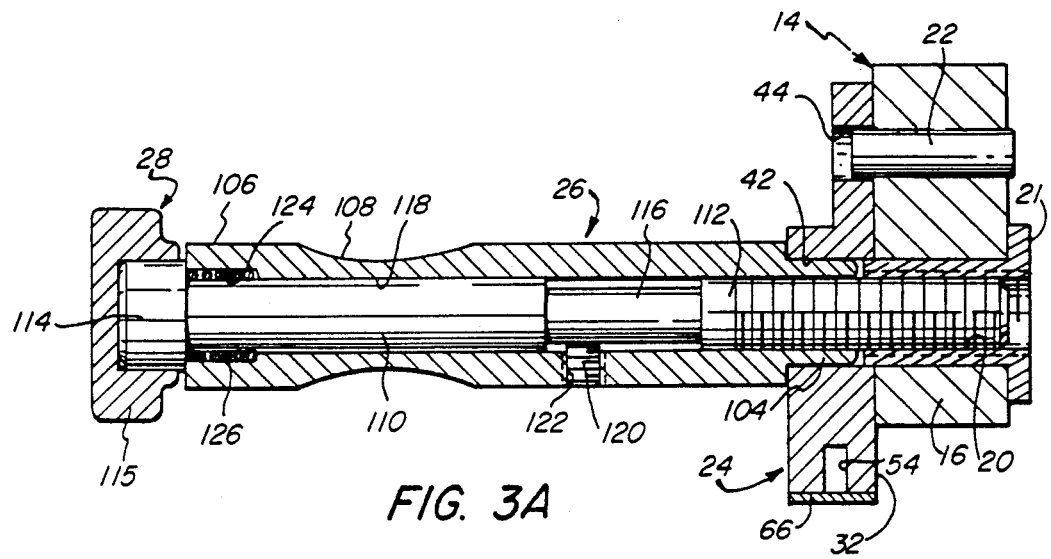
FIG. 3A is a sectional view of the turret assembly and supporting part, taken along line 3—3 of FIG. 2 and drawn to a scale enlarged therefrom.

Turning now in detail to the appended drawings, FIG. 1 shows a cutting head, generally designated by the numeral 10, slidably mounted upon a pair of parallel tubular guide rails 12 of a sheet-cutting machine. The head 10, and its mechanical environment in a cutting machine, are virtually the same as are disclosed in the above-identified Kozyrski patent, except for the cutting element mounting means that are employed herein. Accordingly, with the exception noted, the description of that patent is hereby incorporated hereinto by reference thereto, and in particular the portion of the text beginning in column 6 at line 40 through column 10 at line 51, and the corresponding illustrations.

More specifically, and as best seen in FIG. 2 hereof, in the present cutting head the rocker arm, generally designated by the numeral 14, has a flange-like supporting part 16 at its free end, with a generally planar surface 18 on one side. A press-fit bushing 21 provides a threaded opening 20 extending into the supporting part 16, and the tip of a cylinder dowel pin, or stud 22, projects outwardly therefrom, both on axes that are normal to the surface 18.

The turret assembly of the invention consists of a body portion, generally designated by the numeral 24, a sleeve portion, generally designated by the numeral 26, and a mounting bolt, generally designated by the numeral 28. The body portion 24 has parallel, generally planar faces 30, 32 on its opposite sides, with recessed surface elements 34 and 36 lying in different planes that are depressed from, but parallel to, the face 30. Upstanding rectilinear walls 38, 40 define the inner margins of the two recessed surface elements 34, 36, respectively, and an aperture 42 extends through the body portion 24 in a central location. Three round holes 44, 44', 44" also extend through the body portion 24; they are arranged in a circular array, equiangularly spaced from one another, and the array is concentric with the aperture 42. The holes 44 are of slightly larger diameter than the stud 22, and they are spaced from the aperture 42 by the same distance as exists between the stud 22 and the threaded opening 20. Thus, the stud 22 and holes 44 function cooperatively as detent elements for rotary indexing of the turret assembly.

Three stations are defined on the turret body portion 24, each being specifically adapted to mount a different kind of cutting member, and each being associated with one of the detent holes 44, 44', 44". One station is comprised of a peripheral edge section on which three adjacent flat surfaces 46, 48, 50 are defined, the contiguous ones of which are disposed at obtuse angles to one another. A blind hole 52 extends inwardly from the surface 46, and is bisected by a channel 54 formed into the peripheral edge section at that station and running therealong, on the medial plane of the body portion. Frictionally engaged within the hole 52 and slot 54 is a standard glass-cutting wheel unit, which consists of a U-shaped bracket or clip 56, between the sides of which is rotatably supported, on a short axle 58, a glass-cutting wheel 60; the channel 54 must be sufficiently narrow to securely retain the clip 56 without being so small as to cause binding of the wheel 60.

A threaded bore 62 extends inwardly from the surface 50 and receives a screw 64 for attaching the resilient ramp element 66. The ramp element is bent to conform to the profile of the surfaces 46, 48, 50, and it has a small tang 68 on its free end trapped between the bosses 70 on the surface 48 adjacent the opening of the channel 54. The detent hole 44 is functionally associated with the glass-cutting station.

Figure 7:
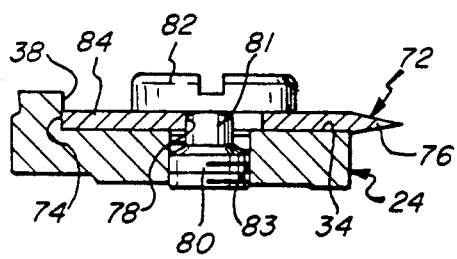
FIG. 7 is an enlarged fragmentary sectional view taken along line 7—7 of FIG. 6.

Recessed surface 34, and the rectilinear wall 38 extending therealong, define a second peripheral station (see especially FIG. 7) on the body portion 24, with which the detent hole 44' is functionally associated. A blade, generally designated by the numeral 72, for cutting plastic is mounted at this station. It is formed with an unsharpened rectilinear edge 74 along one margin, a parallel sharpened edge 76 along an opposite margin, and an angled slot 78 therebetween. For mounting, the blade 72 is slid along the surface 34 with the shaft 80 of a mounting screw 82 (engaged in threaded aperture 83) received in the slot 78, and with the edge 74 disposed along the wall 38. The tapered element 84 defined on the blade 72 will eventually wedge between the wall 38 and the screw shaft 80, in the reduced diameter, thread-free section 81 thereof, thereby ensuring that the sharpened edge 76 will be oriented at a predetermined optimal angle; the screw 82 will of course be tightened to affix the blade 72 in place.

Figure 9:
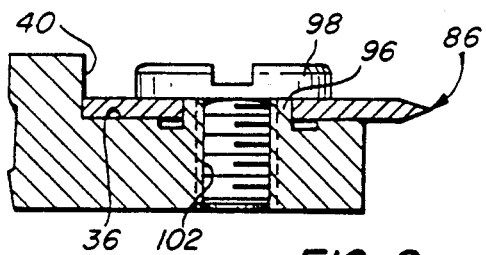
FIG. 9 is an enlarged fragmentary sectional view taken along line 9—9 of FIG. 8.

A mat-cutting blade, generally designated by the numeral 86, is similarly mounted at the third station (see especially FIG. 9) on the body portion 24, with which the detent hole 44" is operatively associated. The blade 86 has a sharpened cutting edge 88 and a parallel opposing rectilinear edge 90; in its properly mounted position the edge 90 bears upon the wall 40, with the blade 86 resting against the surface 36, so as to establish the predetermined optimal orientation of the edge 88.

In this instance, the blade 86 is uniquely formed, with a keyhole slot comprised of a circular portion 92 and a narrower channel portion 94, the latter opening on the edge 90 and lying on an axis that bisects the edge 88. The body portion 24 has a small, short circular boss 94 protecting outwardly of the recessed surface 36, the diameter of which is substantially the same as that of the circular portion 92 of the keyhole slot. The center of the boss 96 and of the circular portion 92 are spaced the same distance from the wall 40 and the edge 90 of the blade, respectively; as a result, the boss and wall will cooperatively locate the mounted blade 86 and also establish it proper orientation. The fastening screw 98 is of course received in the threaded aperture 102 within the boss 96 to fix the blade 86 is place.

It will be appreciated that the surfaces 34 and 36 are at different levels, relative to the face 30, to accommodate the different thicknesses of the blades 72 and 86. This will ensure that their cutting edges will both lie on the medial plane of the body portion 24, as will the edge of the glass-cutting wheel 60.

Figure 3B:
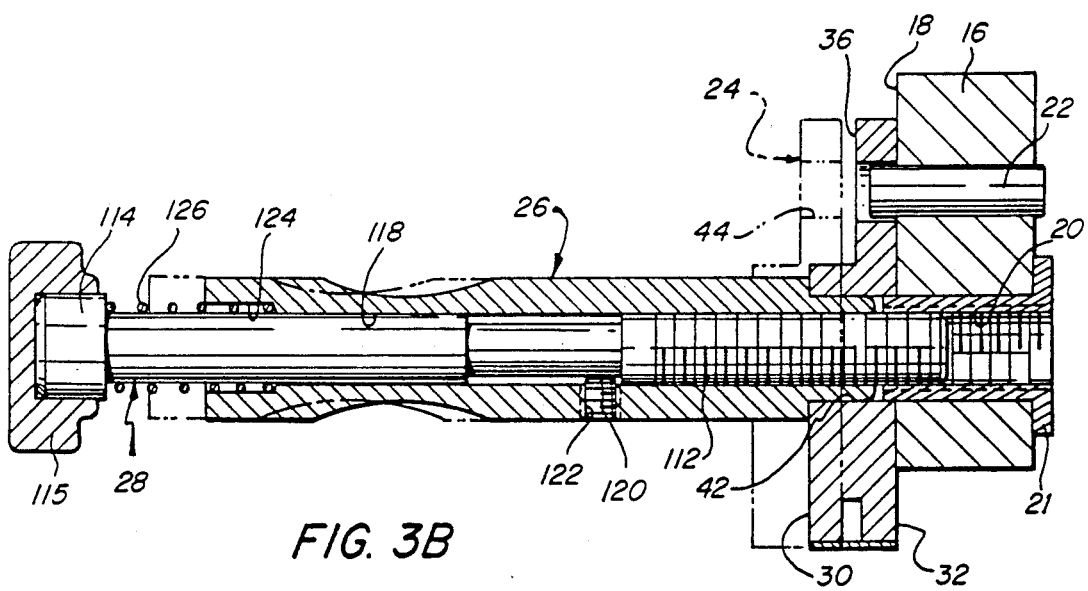
FIG. 3B is a view similar to that of FIG. 3A, showing the mounting bolt of the assembly partially unscrewed from the threaded bushing on the supporting part, and also showing (in full and phantom line, respectively) engaged and disengaged positions of the turret body portion.

As best seen in FIGS. 3A and 3B, the sleeve portion 26 of the turret assembly has a reduced diameter end element 104 which is permanently affixed within the aperture 42 of the body portion 24. The sleeve portion has a knurled section 106 at its opposite (free) end, adjacent to which it has a necked-in section 108; these sections provide means for gripping the sleeve portion to facilitate turning and outward axial displacement of the assembly, respectively.

The mounting bolt 28 includes a shaft 110, with a threaded portion 112 on one end and a head portion 114 on the other, the latter being covered by a knurled cap 115. A circumferential channel extends about the shaft 110 adjacent the threaded portion 112, to provide a reduced diameter intermediate portion 116. The bolt 28 is slidably and rotatably received within the bore 118 of the sleeve portion 26, and is of such a length that the threaded portion 112 and the head portion 114 protrude beyond its opposite ends. A set screw 120 is engaged within an aperture 122 formed through the wall of the sleeve portion 26, and is so located as to cause the end of the screw 120 to lie within the channel about the reduced diameter portion 116, when inserted to a sufficient depth. This serves of course to limit outward axial movement of the bolt 28 within the sleeve portion 26, without preventing free relative rotation therebetween. The outer end of the sleeve portion bore 118 is enlarged at 124, and serves to seat one end of a coil spring 126, the opposite end of which bears upon the head portion 114; the spring 126 thus exerts an outward bias upon the bolt 28, relative to the sleeve portion 26.

The unified body and sleeve portions 24, 26 of the turret assembly are mounted upon the supporting part 16 of the cutting head 10 by engagement of the threaded portion 112 of the bolt shaft 110 within the opening 20 of the busing 21; the outer end of the bushing has an annular flange thereon, to prevent inward disassembly, and the inner end of the bushing is received within the central aperture 42 of the body portion 24.

In the condition shown in FIG. 3A, the assembly is affixed in position on the supporting part, by full tightening of the bolt, with the glass-cutting wheel 60 (not visible in the Figure) operatively disposed, by virtue of engagement of the detent stud 22 within the detent hole 44. Conditioning the head for cutting a different material, by bringing one of the other two stations into operative position, is achieved simply by loosening of the bolt 28 to provided clearance between the head portion 114 and the adjacent end of the sleeve portion 26. This will permit withdrawal of the body portion 24 from the supporting part 16, so as to disengage the dowel pin 22 from the hole 44 and thereby allow relative rotation of the turret assembly. Then, it is simply a matter of aligning and engaging, with pin 22, the detent hole (44' or 44") associated with the selected cutting station, and of tightening the bolt 28 to affix the turret assembly in position.

The glass-cutting wheel 60 is shown in operative position in FIG. 5, with the direction of movement of the cutting head for scoring of the glass sheet 128 indicated by the arrow. Ramp element 66 serves to provide a lead-in with a shallow approach angle, to protect both the glass-cutting wheel and also the edge of the workpiece from damage.

Figure 6:
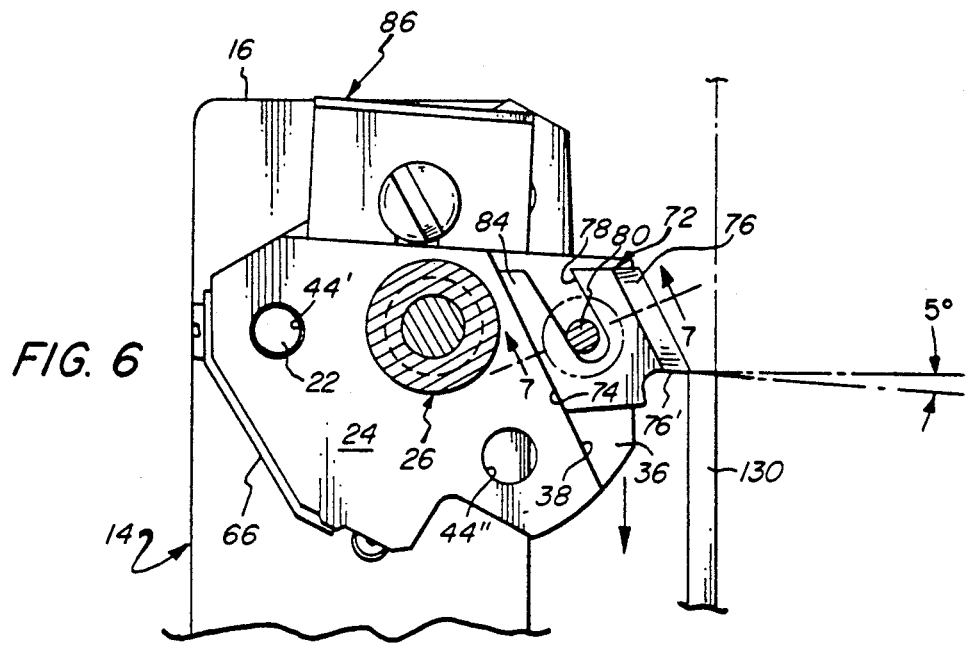
FIG. 6 is a view similar to that of FIG. 5, showing the plastic cutting blade in operative position at the edge of a plastic sheet workpiece.

FIG. 6 shows the turret assembly indexed to bring the plastic cutting blade 72 into operative position for cutting of the plastic sheet 130. The angular relationship between the leading edge 76' and the workpiece is of considerable importance, and will desirably have a value of approximately 95° (i.e., 5° displaced from perpendicular to the plane). If the angle between the edge 76' and the surface of the work is excessive (e.g., 100° or more) there will be a tendency for chattering of the blade to occur, with concomitant roughness of the cut produced; on the other hand, too small of an angle (e.g. 90°) will make cutting difficult. The wall 38 orientation, the fastener 82 and the location of the detent hole 44', cooperate to optimally position the blade 72 so as to achieve smooth and facile cutting of the workpiece 130.

Figure 8:
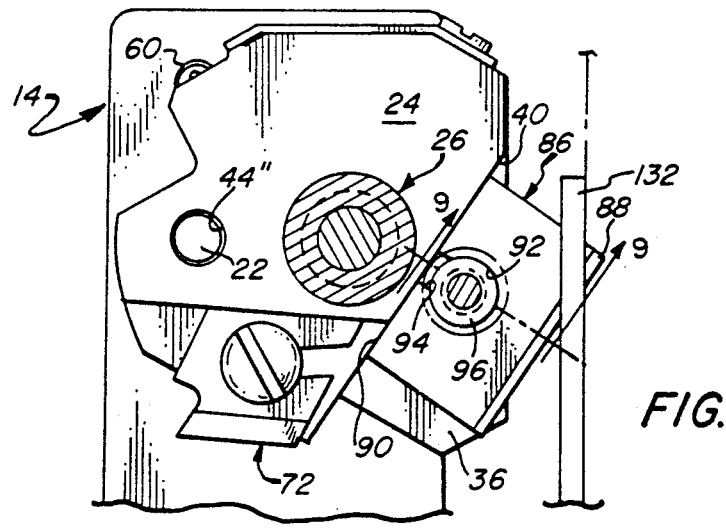
FIG. 8 is another view similar to FIGS. 5 and 6, showing the mat cutting blade in operative position for cutting of a mat workpiece.

Finally, in FIG. 8 the blade 86 is shown in operative position for cutting of the mat 132. Here again, the wall 40, the boss 96 and the associated detent hole 44" cooperate to ensure optimal orientation of the blade 86 (at about 35° to the work surface). As will be appreciated, because the channel 94 of the keyhole slot bisects the sharpened edge 88, the blade 86 may be reversed, endwise about the axis of the channel, to maximize its useful life.

Thus, it can be seen that the present invention provides a novel turret assembly for use in a head for a glass-, plastic-, and mat-cutting machine, and novel machine incorporating the same. The turret assembly has a plurality of cutting elements mounted thereon, which can selectively be brought into operative position, quickly and easily and without need for removal or replacement of any part; it enables the cutting elements to be securely held in optimal positions for cutting effectiveness, and is, in addition, comprised of relatively few parts and is relatively inexpensive and facile to manufacture.

Having thus described the invention what is claimed is:

1. A turret assembly for a multipurpose cutting head, comprising: a generally planar turret body having a peripheral edge; a supporting part; means mounting said turret body on said supporting part for rotation about an axis perpendicular to the plane of said body; a plurality of detent elements cooperatively disposed on said body and said part for disengagably affixing said body in each of a plurality of rotated relationships with respect to said part; a glass-cutting element located at a first location along said peripheral edge of said body and projecting outwardly therebeyond, one of said detent elements being associated with said first location to cooperate with another of said detent elements so as to dispose, in one of said rotated relationships, said glass-cutting element in position for operative movement along a rectilinear line of cutting; and blade means, on said turret body, comprised of a planar blade having an unsharpened rectilinear edge along one margin and providing a plastic-cutting portion located at a second location along said peripheral edge of said body and projecting outwardly therebeyond, a second of said detent elements being associated with said second location to cooperate with said another detent element so as to dispose, in a second of said rotated relationships, said plastic-cutting portion in position for operative movement along said rectilinear line of cutting, said plastic-cutting portion comprising a sharpened, rectilinear edge extending along a margin of said blade opposite to said one margin, and an intersecting leading edge approximately including an elongated ramp element attached at one end to said turret body at a location spaced from said glass-cutting element and extending theretoward along said peripheral edge to provide a free end portion adjacent said glass-cutting element, said leading edge of said plastic-cutting blade portion facing said free end portion of said ramp element.

2. The assembly of claim 1 wherein said predetermined angle, taken with reference to said rectilinear axis, has a value that is greater than 90° and less than 100°.

3. The assembly of claim 1 wherein said blade means includes a mat-cutting portion located at a third location along said peripheral edge and projecting outwardly therebeyond, a third of said detent elements being associated with said third location to cooperate with said another detent element so as to dispose, in a third of said rotation relationships, said mat-cutting portion in position for operative movement along said rectilinear axis, said mat-cutting portion comprising a sharpened, rectilinear blade edge forming an angle with said rectilinear axis in said third relationship.

4. The assembly of claim 3 wherein said angle formed by said sharpened edge of said mat-cutting blade portion is about 35°.

5. The assembly of claim 3 wherein said turret body has a medial plane, and wherein said glass-cutting element and said plastic-cutting and mat-cutting portions are all disposed on said medial plane.

6. A turret assembly for a multipurpose cutting head, comprising: a generally planar turret body having a peripheral edge; a supporting part; means mounting said turret body on said supporting part for rotation about an axis perpendicular to the plane of said body; a plurality of detent elements cooperatively disposed on said body and said part for disengagably affixing said body in each of a plurality of rotated relationships with respect to said part; a glass-cutting element located at a first location along said peripheral edge of said body and projecting outwardly therebeyond, one of said detent elements being associated with said first location to cooperate with another of said detent elements so as to dispose, in one of said rotated relationships, said glass-cutting element in position for operative movement along a rectilinear line of cutting; blade means on said turret body, including a plastic-cutting portion located at a second location along said peripheral edge and projecting outwardly therebeyond, and a mat-cutting portion located at a third location along said peripheral edge and projecting outwardly therebeyond, a second of said detent elements being associated with said second location to cooperate with said another detent element so as to dispose, in a second of said rotated relationships, said plastic-cutting portion in position for operative movement along said rectilinear line of cutting, said plastic-cutting portion comprising a sharpened, rectilinear blade edge and an intersecting leading edge extending at an angle thereto, said leading edge forming, in said second relationship, a selected, optimal angle with said rectilinear line of cutting, a third of said detent elements being associated with said third location to cooperate with said another detent element so as to disposed, in a third of said rotated relationships, said mat-cutting portion in position for operative movement along said rectilinear line of cutting, said mat-cutting portion comprising a sharpened, rectilinear blade edge forming an angle with said rectilinear line of cutting in said third relationship; and an elongated ramp element attached at one end to said turret body at a location spaced from said glass-cutting element and extending theretoward along said peripheral edge of said body, to provide a free end portion adjacent said glass-cutting element, said leading edge of said plastic-cutting blade portion confronting said free end portion of said ramp element.

7. The assembly of claim 6 wherein said blade means comprises a planar blade having an unsharpened rectilinear edge along one margin, and wherein said turret body has structure defining a wall against which said unsharpened edge of said blade is disposed to orient said leading edge at said predetermined angle.

8. The assembly of claim 6 wherein said mat-cutting portion is provided by a planar blade that is symmetrical about a bisecting axis, said blade edge of said mat-cutting portion having sections for cutting disposed to opposite sides of said bisecting axis.

9. A turret assembly for a multipurpose cutting head, comprising: a generally planar turret body having a peripheral edge; a supporting part; means mounting said turret body on said supporting part for rotation about an axis perpendicular to the plane of said body; a plurality of detent elements cooperatively disposed on said body and said part for disengagably affixing said body in each of a plurality of rotated relationships with respect to said part; a glass-cutting element located at a first location along said peripheral edge of said body and projecting outwardly therebeyond, and an elongated ramp element associated with said glass-cutting element and extending along said peripheral edge of said body, one of said detent elements being associated with said first location to cooperate with another of said detent elements so as to dispose, in one of said rotated relationships, said glass-cutting element in position for operative movement along a rectilinear line of cutting; blade means on said turret body, including a plastic-cutting portion located at a second location along said peripheral edge and projecting outwardly therebeyond, a second of said detent elements being associated with said second location to cooperate with said another detent element so as to dispose, in a second of said rotated relationships, said plastic-cutting portion in position for operative movement along said rectilinear line of cutting, said plastic-cutting portion comprising a sharpened, rectilinear blade edge and an intersecting leading edge extending at an angle thereto, a third of said detent elements being associated with said third location to cooperate with said another detent element so as to dispose, in a third of said rotated relationships, said mat-cutting portion in position for operative movement along said rectilinear line of cutting, said mat-cutting portion comprising a sharpened, rectilinear blade edge forming an angle with said rectilinear line of cutting in said third relationship, said plastic cutting portion being positioned and oriented with said blade edge thereof adjacent said blade edge of said mat-cutting portion and with said leading edge remote therefrom.

10. The assembly of claim 9 wherein said blade means comprises a planar blade having an unsharpened rectilinear edge along one margin, and wherein said turret body has structure defining a wall against which said unsharpened edge of said blade is disposed to orient said leading edge at said predetermined angle.

* * * * *

UNITED STATES PATENT AND TRADEMARK OFFICE
CERTIFICATE OF CORRECTION

PATENT NO. : 5,168,788
DATED : December 8, 1992
INVENTOR(S) : Vincent T. Kozyrski and Alan R. Peters It is certified that error appears in the above-identified patent and that said Letters Patent is hereby corrected as shown below:

Claim 1, column 6, lines 54 and 55, delete "approximately" and insert --extending at an angle thereto; said assembly additionally--

Claim 3, column 7, line 4, delete "rotation" and substitute therefor --rotated--

Claim 9, column 8, line 34, insert after "therebeyond," --and a mat-cutting portion located at a third location along said peripheral edge and projecting outwardly therebeyond,--

Signed and Sealed this

Nineteenth Day of October, 1993

Attest:

BRUCE LEHMAN

Attesting Officer     Commissioner of Patents and Trademarks